US011801800B2

(12) United States Patent
Colmont et al.

(10) Patent No.: US 11,801,800 B2
(45) Date of Patent: Oct. 31, 2023

(54) ENERGY ABSORBING DEVICE, MOTOR VEHICLE BODY AND METHOD FOR MANUFACTURING THEREOF

(71) Applicant: ArcelorMittal, Luxembourg (LU)

(72) Inventors: Jean-Louis Colmont, Cergy Saint Christophe (FR); Thierry Derchu, Bar le Duc (FR); Sébastien Albeaux, La Neuville Aux Bois (FR); Guillaume De Taillac, Chalons-en-Champagne (FR)

(73) Assignee: ARCELORMITTAL, Luxembourg (LU)

( * ) Notice: Subject to any disclaimer, the term of this patent is extended or adjusted under 35 U.S.C. 154(b) by 251 days.

(21) Appl. No.: 17/275,074

(22) PCT Filed: Sep. 11, 2019

(86) PCT No.: PCT/IB2019/057645
§ 371 (c)(1),
(2) Date: Mar. 10, 2021

(87) PCT Pub. No.: WO2020/053779
PCT Pub. Date: Mar. 19, 2020

(65) Prior Publication Data
US 2021/0253051 A1 Aug. 19, 2021

(30) Foreign Application Priority Data
Sep. 11, 2018 (WO) .................. PCT/IB2018/056925

(51) Int. Cl.
*B60R 19/34* (2006.01)
*B60R 19/18* (2006.01)

(52) U.S. Cl.
CPC .............. *B60R 19/34* (2013.01); *B60R 19/18* (2013.01); *B60R 2019/1813* (2013.01)

(58) Field of Classification Search
CPC .. B60R 19/34; B60R 19/18; B60R 2019/1813
See application file for complete search history.

(56) References Cited

U.S. PATENT DOCUMENTS

| 4,974,820 A | 12/1990 | Nakanishi |
| 6,135,251 A | 10/2000 | Hartlieb et al. |
| (Continued) | | |

FOREIGN PATENT DOCUMENTS

| CN | 101400552 A | 4/2009 |
| CN | 206141628 U | 5/2017 |
| (Continued) | | |

OTHER PUBLICATIONS

Search Report for PCT/IB2019/057645.
(Continued)

*Primary Examiner* — Dennis H Pedder
*Assistant Examiner* — Melissa Ann Bonifazi
(74) *Attorney, Agent, or Firm* — Davidson, Davidson & Kappel, LLC

(57) ABSTRACT

An energy absorbing device is designed to increase the amount of absorbed energy and control the deformation of the device in case of an impact. The energy absorbing device consists in a hollow longitudinal member extending along a first longitudinal axis and a longitudinal guide extending along a second longitudinal axis, arranged within the longitudinal member and suitable for guiding the deformation of the longitudinal member in case of an impact. The length ratio between the longitudinal guide and the member is comprised between the values of 1/5 and 3/5.

14 Claims, 4 Drawing Sheets

(56) References Cited

U.S. PATENT DOCUMENTS

| | | | |
|---|---|---|---|
| 8,814,250 B2 * | 8/2014 | Fukawatase | ............ B60R 19/36 |
| | | | 296/133 |
| 10,077,015 B2 * | 9/2018 | Mukainakano | ......... B60R 19/34 |
| 2009/0134643 A1 | 5/2009 | Alvarsson et al. | |
| 2010/0230222 A1 | 9/2010 | Canot et al. | |
| 2013/0300139 A1 | 11/2013 | Fukawatase | |
| 2015/0069773 A1 | 3/2015 | Mukainakano et al. | |
| 2018/0065670 A1 | 3/2018 | Yamada et al. | |
| 2021/0155180 A1 * | 5/2021 | Faruque | ................. B33Y 80/00 |

FOREIGN PATENT DOCUMENTS

| | | | | |
|---|---|---|---|---|
| CN | 107792184 | A | 3/2018 | |
| DE | 19637244 | A1 | 3/1998 | |
| DE | 19745656 | A1 | 4/1999 | |
| DE | 102005026284 | B3 | 11/2006 | |
| DE | 102014217031 | A1 | 3/2015 | |
| EP | 2799289 | A1 | 11/2014 | |
| EP | 3932749 | A1 * | 1/2022 | ............. B60R 19/18 |
| FR | 2855805 | A1 | 12/2004 | |
| WO | WO2013164931 | A1 | 11/2013 | |

OTHER PUBLICATIONS

International Preliminary Report on Patentability for PCT/IB2019/057645.
Search Report for PCT/IB2018/056925.

* cited by examiner

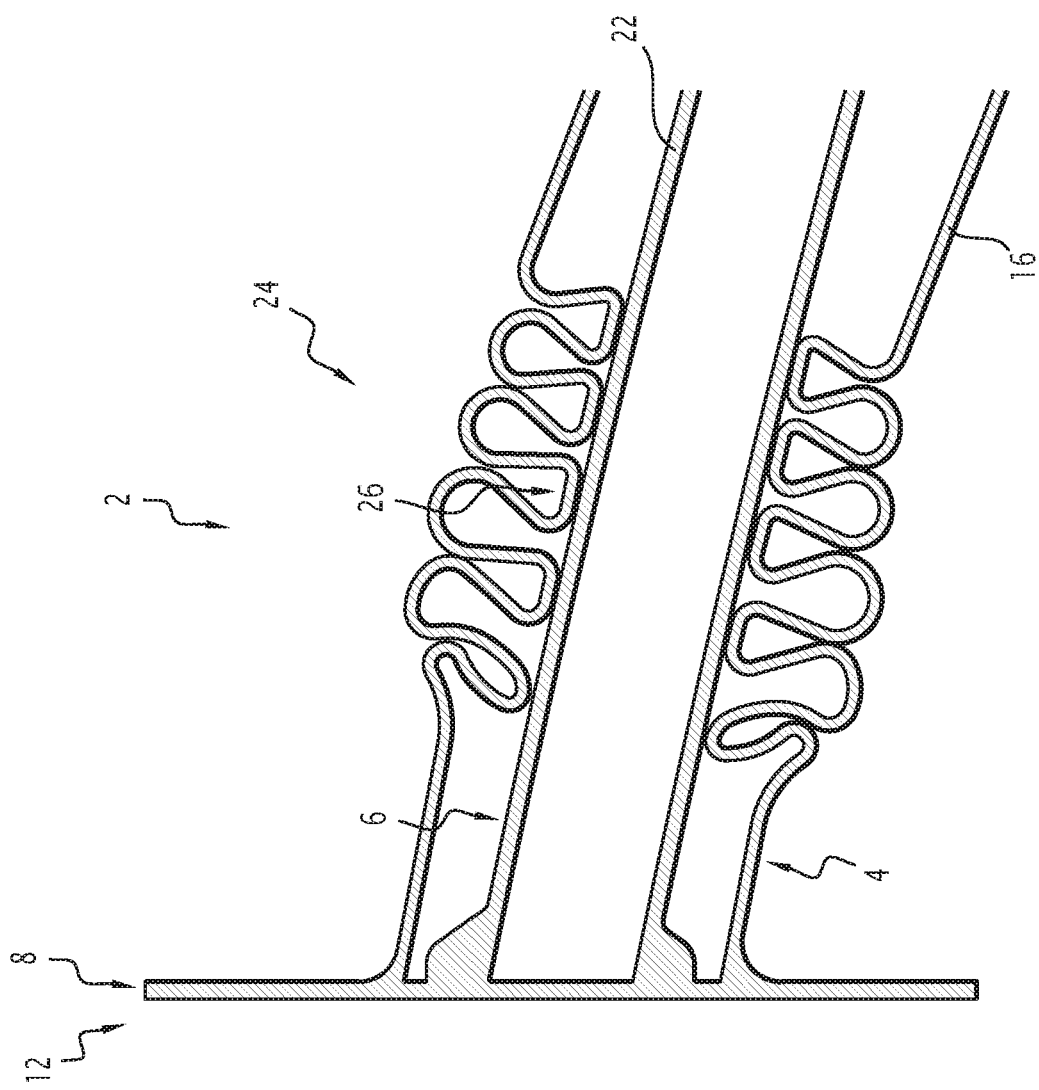

ENERGY ABSORBING DEVICE, MOTOR VEHICLE BODY AND METHOD FOR MANUFACTURING THEREOF

The present disclosure relates to an energy absorbing device for a motor vehicle comprising a hollow longitudinal member extending along a first longitudinal axis and a longitudinal guide extending along a second longitudinal axis, arranged within the longitudinal member and suitable for guiding the deformation of the longitudinal member in case of an impact.

BACKGROUND

In a motor vehicle, energy absorbing devices, such as crash-boxes or cradles, are components which aim at dissipating the energy in case of an impact against the motor vehicle, to prevent injuries to the passengers and/or damages to the vehicle components. To this end, these energy absorbing devices are arranged to be deformed according to a specific kinematic, when the force applied on the device is greater than a predetermined value, such that the deformed material dissipates a part of the impact energy, which is therefore not transmitted to the vehicle compartment and its occupants.

A solution to this problem is also obtained by deforming the energy absorbing devices along their main axis such that the material of the energy absorbing devices forms folds while absorbing energy. With this solution, the deformation respects the volumes allocated to each component and such a deformation kinematic increases the amount of dissipated energy.

Furthermore, the possibilities of deformation of these energy absorbing devices are limited by the other equipment surrounding them, such as the motor, the gearbox, the radiators or the wheel houses. During the deformation, the energy absorbing devices must not collide into the surrounding equipment. For example, in case of collision between these energy absorbing devices and a wheel, there is a risk of loss of vehicle control.

In many cases, the energy absorbing device has a long and narrow shape, due to the limited available space and due to the fact that it is designed to link two mechanical parts which are located at a given distance from one another. The shape of the energy absorbing device can be characterized by its slenderness ratio $\lambda$, as defined by $\lambda = L/\sqrt{(Imin/A)}$, where:

L is the length of the energy absorbing device,

Imin is the second moment of inertia of the energy absorbing device,

A is the total cross sectional area of the energy absorbing device.

When the slenderness ratio $\lambda$ is above 25, the energy absorbing device is prone to generalized failure of the part by buckling under compressive load, which results in low absorbed energy and catastrophic damage to the surrounding parts of the vehicle.

A first solution to prevent generalized buckling of the part is to introduce local alterations on the front end of the part, closest to the point where the compressive load is applied, such as described in FR2855805. The localized weakening of the part introduced by the geometrical alterations forces localized buckling of the part in these areas, thereby dissipating a portion of the impact energy and preventing overall buckling of the part, providing the load remains below a maximum level.

In order to better control the axial deformation and prevent displacement of the part away from its original axis during impact, a further solution consists in arranging a guide inside the energy absorbing device, in order to guide the deformations of the device.

DE 19637244 discloses such a solution. However, if the guide is not properly arranged in the device, then the energy absorption is not optimized.

SUMMARY

One of the aims of the present disclosure is to provide an energy absorbing device for a motor vehicle that has an optimal design to allow good guiding of the device along its main axis during deformation and to maximize its energy absorption in case of impact.

According to the present disclosure, this object is achieved by an energy absorbing device of the previous type, wherein the ratio of the longitudinal guide length, measured along the second longitudinal axis, to the longitudinal member length, measured along the first longitudinal axis, is comprised between 1/5 and 3/5.

Such design is particularly desirable to have a maximal deformation of the longitudinal member and therefore a maximal energy absorption, in case of impact.

According to particular embodiments, the energy absorbing device includes one, several or all of the following features in all technically possible combinations:

- the longitudinal guide has constant cross section along its whole length, and the longitudinal member has structural weaknesses, the longitudinal member having constant cross section along its whole length apart from the structural weaknesses;
- the ratio of the longitudinal member constant cross section to the longitudinal guide constant cross section is comprised between 2 and 9;
- the longitudinal member constant cross section is delimited by an outer contour, the outer contour defining a geometrical barycenter point, the geometrical barycenter point being included in the longitudinal guide constant cross section;
- the structural weaknesses are predetermined portions of the longitudinal member which are weakened, at least one structural weakness being for example a welding line or a through hole or a row of through holes or a local reduction of cross section, or a change in the thickness or a change in the material of the longitudinal member;
- each structural weakness extends in a plane perpendicular to the first longitudinal axis of the longitudinal member;
- the longitudinal guide comprises a guide wall having a thickness comprised between 1 mm and 4.0 mm;
- the longitudinal member is closed at one end by a closing plate, the longitudinal guide being attached to said closing plate inside the longitudinal member;
- the longitudinal guide is integral with the longitudinal member;
- the longitudinal guide and the longitudinal member have rectangular or polygonal or circular cross sections;
- the longitudinal member comprises a member wall having a slenderness ratio ($\lambda$) above 25, as defined by $\lambda = L/\sqrt{(Imin/A)}$ where:
  L is the length of the member wall,
  Imin is the second moment of inertia of the member wall,
  A is the total cross-sectional area of the member wall; and the longitudinal member is a crash box or an extension of a cradle of the vehicle.

The present disclosure also provides a motor vehicle comprising an energy absorption device as described above.

The present disclosure also provides a method for manufacturing an energy absorbing device as described above, comprising the steps of:
- manufacturing a hollow longitudinal member,
- manufacturing a longitudinal guide, the ratio of the longitudinal guide length to the longitudinal member length being comprised between 1/5 and 3/5,
- assembling together said longitudinal guide in said longitudinal member.

According to a particular embodiment of the method, the step of assembling comprises the steps of:
- welding the longitudinal guide to a closing plate,
- welding the longitudinal member to said closing plate, the longitudinal guide being arranged inside the longitudinal member.

BRIEF SUMMARY OF THE DRAWINGS

Other aspects and advantages of the present disclosure will appear upon reading the following description, given by way of example and made in reference to the appended drawings, wherein:

FIG. 4 is an enlarged view of area IV of FIG. 3.

DETAILED DESCRIPTION

Figure 1:
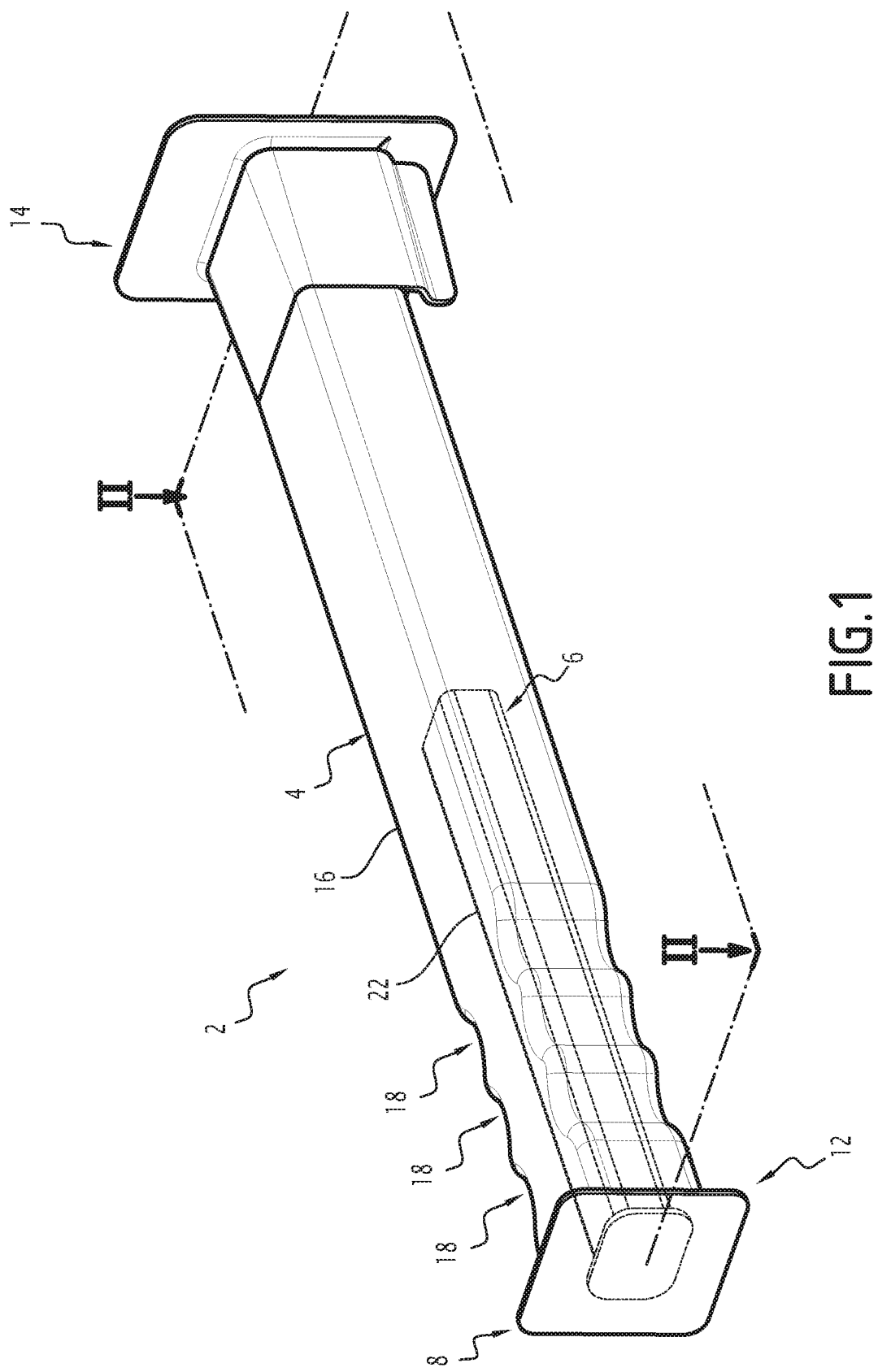
FIG. 1 is a perspective view of an energy absorbing device according to an embodiment of the present disclosure.
Figure 2:
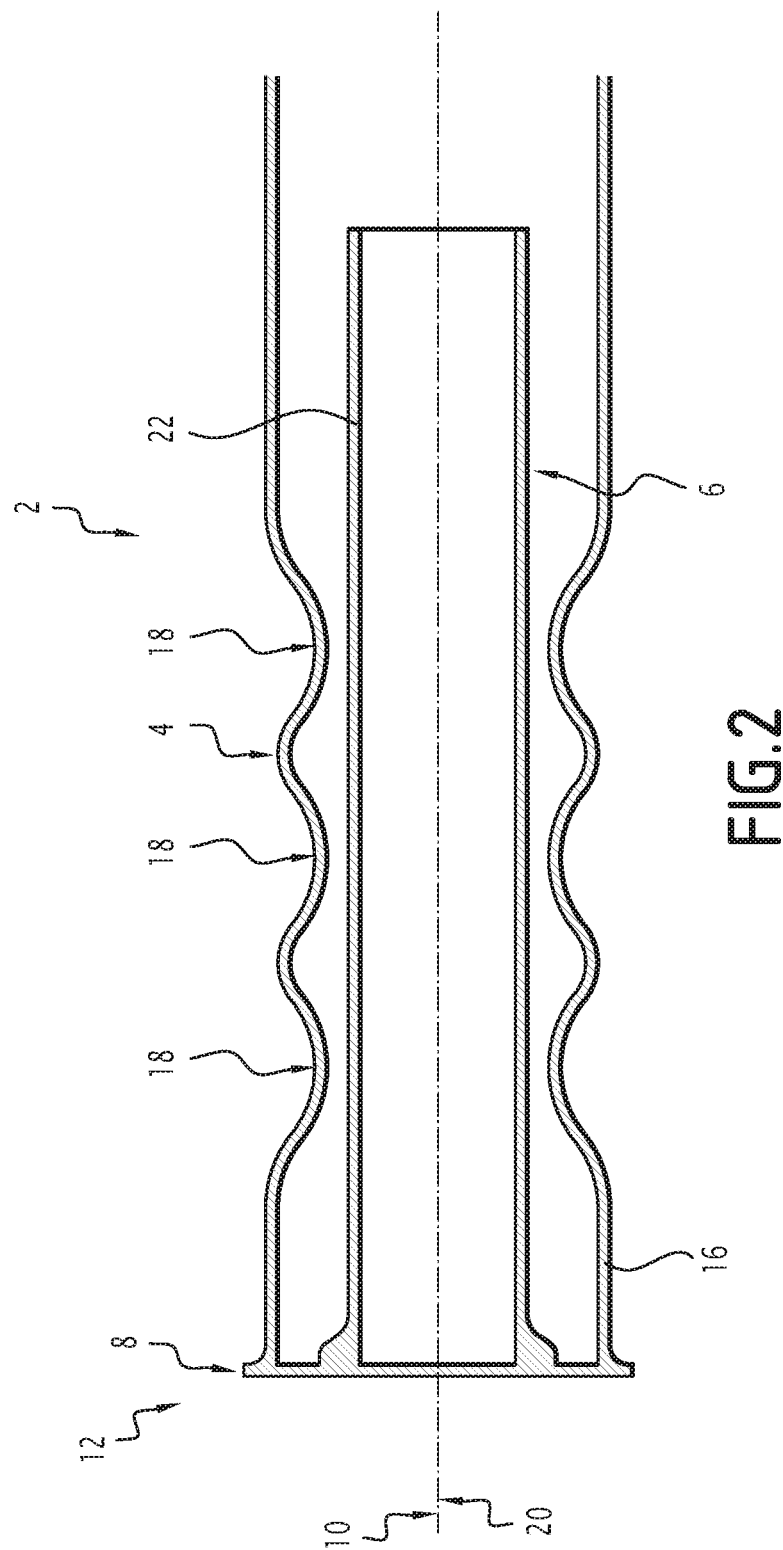
FIG. 2 is a sectional view along plane II-II of FIG. 1.

An embodiment of an energy absorbing device 2 according to the present disclosure is depicted in FIGS. 1 and 2.

The energy absorbing device 2 is, for example, a crashbox or an extension of a cradle of a motor vehicle. In case of an impact, the energy absorbing device 2 is deformed in order to dissipate the energy of the impact such that this energy is not transmitted to the remainder of the vehicle For example, two energy absorbing devices 2 are integrated in a motor vehicle, as front energy absorbing devices at the front of the vehicle. The energy absorbing devices 2 are then, for example, connected to a bumper beam extending transversally between the energy absorbing devices. It should be noted that energy absorbing devices can also be integrated at the rear of the vehicle.

The energy absorbing device 2 comprises a hollow longitudinal member 4, a longitudinal guide 6 and a closing plate 8.

The longitudinal member 4 is arranged to deform during an impact, and thus absorb the energy of the impact by folding on itself as will be described subsequently.

The longitudinal member 4 extends along a first longitudinal axis 10 from a first end 12 to a second end 14 and comprises a member wall 16.

For example, the longitudinal member 4 is rectilinear, namely the first longitudinal axis 10 is rectilinear. Alternatively, the longitudinal member 4 can be bent to adapt to its location in a motor vehicle and to the parts surrounding the longitudinal member 4 at said location.

The member wall 16 is for example made of steel, notably a HX340LAD type steel.

The member wall 16 has for example a thickness above 1 mm, preferably above 1.5 mm.

The member wall 16 for example has a slenderness ratio $\lambda$ above 25, as defined by $\lambda = L/\sqrt{(Imin/A)}$ where:

L is the length of the member wall 16

Imin is the second moment of inertia of the member wall 16,

A is the maximal cross section of an outer surface of the member wall 16.

The longitudinal member 4 has, for example, a rectangular cross section. The first longitudinal axis 10 extends along a longitudinal direction.

In a mounted vehicle, the longitudinal direction corresponds, for example, to the rear-front direction of the vehicle.

The longitudinal member 4 is closed at the first end 12, by the closing plate 8. In case of an impact, the impact is applied on the first end 12 of the longitudinal member 4 through the closing plate 8. The closing plate 8 can also serve as a fixing plate for the bumper beam.

The longitudinal member 4 preferably has structural weaknesses 18, preferably located in the vicinity of the first end 12, to control the kinematic and the start of the deformation of the longitudinal member 4.

In particular, the structural weaknesses 18 are predetermined portions of the longitudinal member 4 which are weakened, meaning that the mechanical resistance of the longitudinal member 4 is reduced in these portions compared to the longitudinal member 4 outside of these portions.

The structural weaknesses 18 are therefore portions of the longitudinal member 4 designed to bend more easily than the rest of the longitudinal member 4.

The structural weaknesses 18 are designed so that, in case of a crash, the longitudinal member 4 initially deforms at the location of these structural weaknesses 18.

Each structural weakness 18 respectively extends along at least a portion of the longitudinal member 4.

In the case of a rectangular section of the longitudinal member 4, the structural weaknesses 18 are distributed on at least one side of the rectangular section of the longitudinal member 4. On the example illustrated on FIG. 1, structural weaknesses 18 are located on two opposite sides of the longitudinal member 4.

Each structural weakness 18 extends preferably over the entire width of a side of the longitudinal member 4.

In addition, each structural weakness 18 extends in a plane perpendicular to the first longitudinal axis of the longitudinal member 4.

In FIGS. 1 and 2, the structural weaknesses 18 are in the form of local reductions of cross section of the longitudinal member 4.

In particular, in FIGS. 1 and 2, each structural weakness 18 is a fold having in this example an arc of circle shape.

For example, the structural weaknesses 18 of at least one side of the longitudinal member 4 are regularly distributed along its length. More precisely, each structural weakness 18 defines a closest point to the longitudinal guide 6, the distance between the closest points of two successive structural weaknesses 18 being constant along the length of the longitudinal member 4.

The longitudinal guide 6 is arranged within the longitudinal member 4 and extends along a second longitudinal axis 20.

The second longitudinal axis 20 is for example parallel to the first longitudinal axis 10. Alternatively, the second longitudinal axis 20 and the first longitudinal axis 10 define between them an angle greater than 5°. According to a particular embodiment, the second longitudinal axis 20 is parallel to the first longitudinal axis in a first region of the longitudinal member and is inclined relative to the first longitudinal axis in a second region of the longitudinal member.

The longitudinal guide 6 is arranged for guiding the deformation of the longitudinal member 4 along the second longitudinal axis 20 in case of an impact.

By guiding, it is meant that the deformation of the longitudinal member 4 occurs along the first longitudinal axis 10 and the longitudinal member 4 is substantially not bent along another axis thanks to the guiding of the longitudinal guide 6.

The longitudinal guide 6 comprises a guide wall 22.

Preferably, the guide wall 22 has a thickness comprised between 1.0 mm and 4.0 mm.

In case of an impact and in order to obtain an optimized energy absorption, the longitudinal member 4 gets crushed along its axis 10 in such a way that the material of the longitudinal member 4 forms folds while absorbing energy. The energy absorption occurs with the folds formation. As the number of folds increases and/or as the amplitude of the folds increases, the energy absorption increases, the amplitude of a fold being defined as the distance, in a plane substantially perpendicular to the first longitudinal axis 10, between a top and a bottom of the fold, the top being the farthest region of the fold from the first longitudinal axis 10 and the bottom being the closest region of the fold to the first longitudinal axis 10. In the absence of the longitudinal guide 6, there will be two competing reactions of the longitudinal member 4 to the compressive force resulting from an impact: the first reaction is to locally absorb part of the impact energy thanks to the formation of folds in the areas comprising structural weaknesses 18, the second reaction is for the longitudinal member 4 to deform by generalized bending of the longitudinal member 4 around an axis located in a plane generally perpendicular to the compressive force. As explained previously, the second reaction is not desirable because the longitudinal member 4 will absorb far less energy by generalized bending than by the formation of folds. Furthermore, the generalized bending of the longitudinal member 4 can result in the collision of the longitudinal member 4 with other elements of the vehicle. The presence of the longitudinal guide 6, by forcing the deformation of the longitudinal member 4 to stay comprised between the first longitudinal axis 10 and the second longitudinal axis 20, prevents the generalized bending of the longitudinal member 4 and therefore promotes the energy absorption through the formation of folds in the areas of the longitudinal member 4 comprising structural weaknesses 18.

To this end, the longitudinal member 4 and the longitudinal guide 6 are arranged such that, in case of an impact, the member wall 16 of the longitudinal member 4 is deformed into a wave shape 24, each wave being a fold.

The longitudinal guide 6 can have a polygonal, for example a rectangular or a square, or a circular cross section.

The longitudinal guide 6 can be hollow or alternatively a completely filled volume, without void inside.

The longitudinal guide 6 is for example made in the same material than the longitudinal member 4.

For example, the longitudinal guide 6 is made of steel, notably a HX340LAD type steel.

The longitudinal guide 6 is attached to the closing plate 8 inside the longitudinal member 4. In one embodiment, the longitudinal member 4 and the longitudinal guide 6 are welded to the closing plate 8. This embodiment is depicted in the FIGS. 1 to 4. In another embodiment, the longitudinal guide 6 and the closing plate 8 are integral with the longitudinal member 4.

The ratio of the longitudinal guide length, measured along the second longitudinal axis 20, to the longitudinal member length, measured along the first longitudinal axis 10, is comprised between 1/5 and 3/5.

These particular upper and lower limit values define an optimal design of the energy absorbing device 2 in terms of amount of energy absorbed.

Indeed, the longitudinal guide 6 must be long enough to fully guide the deformation of the longitudinal member 4, thus allowing a maximal dissipation of energy. The longitudinal guide 6 reduces the deformation of the longitudinal member 4 out of the first longitudinal axis 10. If the longitudinal guide 6 is not long enough, the longitudinal member 4 bends out of the first longitudinal axis 10, at the beginning of the crash. This bending prevents the longitudinal member 4 from deforming in the wave shape, and the longitudinal member 4 does not dissipate the energy in an optimized manner.

In addition, the longitudinal guide 6 must not be too long or, during an impact, it will contact the second end 14 of the longitudinal member 4, and will not be allowed to be fully deformed, thus transmitting energy to the rest of the vehicle.

Apart from the structural weaknesses 18, the longitudinal member 4 and the longitudinal guide 6 have constant cross sections along their whole lengths. The ratio of the longitudinal member cross section to the longitudinal guide cross section is then comprised between 2 and 9. By "cross section", it is meant the cross section of an outer surface of the longitudinal member 4 or of the longitudinal guide 6.

Figure 3:
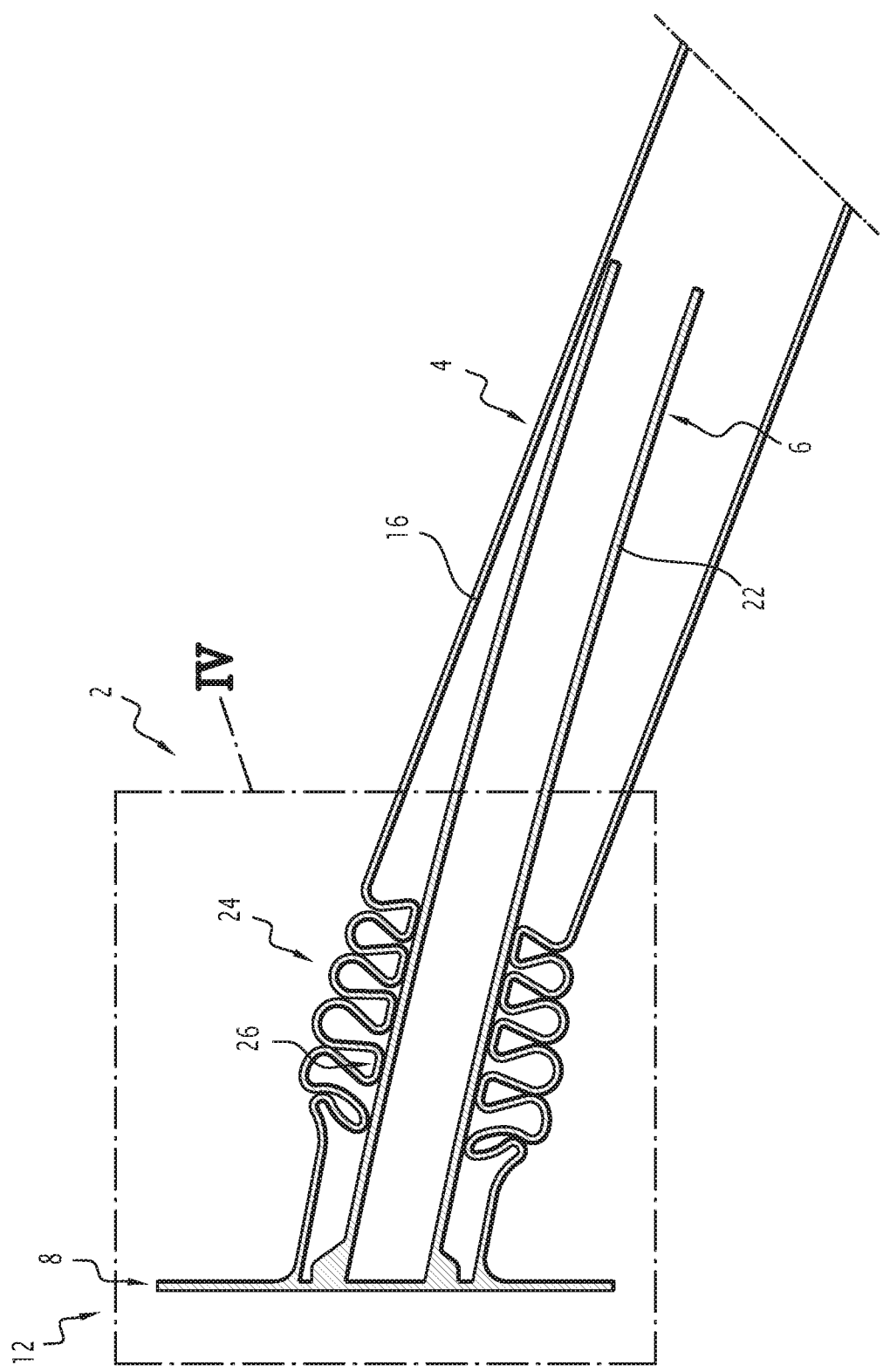
FIG. 3 is a partial sectional view of a deformed energy absorbing device.

These particular upper and lower limit values define a complementary optimal design of the energy absorbing device 2 in terms of amount of energy absorbed. Indeed, if the ratio of cross sections is below 2, the distance between the longitudinal member 4 and the longitudinal guide 6 can be too small to allow a full formation of the wave shape 24 of the member wall 16 in case of crash. In addition, if the ratio of cross sections is above 9, the distance between the longitudinal member 4 and the longitudinal guide 6 can be too large to ensure that, in case of an impact, the wave shape 24 of the deformed member wall 16 has wave troughs 26, or bottom of the waves, which bear against the guide wall 22 of the longitudinal guide 6. This wave shape 24 is shown in FIGS. 3 and 4. The contact between the wave troughs 26 and the guide wall 22 forces a further bending of the side wall 24, thereby increasing the amount of absorbed energy.

Furthermore, the longitudinal member constant cross section is delimited by an outer contour, the outer contour defining a geometrical barycenter point, the geometrical barycenter point being preferably included in the longitudinal guide constant cross section.

For example, the geometrical barycenter point of a rectangular cross section is the intersection of the diagonals. In addition, the geometrical barycenter point of a circular cross section is the center of the cross section.

This feature further optimizes the amount of energy which can be absorbed by the energy absorbing device 2. Indeed, this feature ensures that an offset between the first longitudinal axis 10 and the second longitudinal axis 20 is not too important so that the wave troughs 26 contact the guide wall 22 during the deformation of the longitudinal member 4 due to a crash.

Advantageously, as illustrated in the example of FIGS. 1 and 2, the longitudinal guide 6 is centered with respect to a cross section of the longitudinal member 4, the first longitudinal axis 10 thus coinciding with the second longitudinal axis 20. Centering the longitudinal guide 6 allows an optimum in terms of energy absorption in case of a crash.

A method for manufacturing the energy absorbing device described above will now be explained. Such method comprises the following steps:

manufacturing the hollow longitudinal member 4, manufacturing the longitudinal guide 6, the ratio of the longitudinal guide length to the longitudinal member length being comprised between 1/5 and 3/5.

assembling together said longitudinal guide 6 in said longitudinal member 4.

For example, the step of assembling comprises the steps of:

welding the longitudinal guide 6 to a closing plate 8, welding the longitudinal member 4 to said closing plate 8, the longitudinal guide 6 being arranged inside the longitudinal member 4.

While the present disclosure has been described in detail in connection with only a limited number of embodiments, it should be readily understood that the present disclosure is not limited to such disclosed embodiments.

Alternatively, the longitudinal guide 6 and/or the longitudinal member 4 have polygonal or circular constant cross sections.

Alternatively, at least one or each structural weakness 18 is, for example, a welding line or a through hole or a row of through holes, or is a change in the cross section, in the thickness or in the material of the longitudinal member 4.

Alternatively, the structural weaknesses 18 of at least one side of the longitudinal member 4 are not regularly distributed along its length.

Alternatively, the second longitudinal axis 20 is offset with respect to the first longitudinal axis 10, the geometrical barycenter point of the longitudinal member constant cross section being included in the longitudinal guide constant cross section.

A first example of various energy absorbing devices illustrating the present disclosure will now be detailed in reference to below Table 1.

In all examples of Table 1, the longitudinal member 4 has the same characteristics. The longitudinal member 4 has a length of 500 mm, outer dimensions of 47.4 mm by 39.7 mm, a wall thickness of 1.8 mm and is made of HX340LAD type steel. The longitudinal member 4 has structural weaknesses at the vicinity of its first end 12.

The longitudinal guide 6 has a square cross section of 20 mm*20 mm and is made of the same material HX340LAD steel as the longitudinal member 4.

The longitudinal guide 6 has a thickness of 2 mm.

Different lengths of the longitudinal guide 6 have been chosen in order to illustrate the advantages of the present disclosure.

The results of numerical simulations of the absorbed energy during impact of the different configurations of the energy absorbing device have been compared to two reference cases, R1 which corresponds to the longitudinal member 4 without any longitudinal guide 6, and R2 which corresponds to the longitudinal member 4 with a longitudinal guide 6 measuring 450 mm long, i.e. a ratio of the longitudinal guide 6 to the longitudinal member 4 of 4.5/5, which is outside of the maximum length ratio range as defined above. The results are summarized in table 1.

As can be seen in R2, when using a longitudinal guide 6 of 450 mm, with a length ratio to the longitudinal member 4 above 3/5, the absorbed energy decreases significantly compared to the reference case without guide tube R1. This is due to the fact that the guide tube 6 comes in contact with the back closing plate 14 during impact before full energy absorption by the longitudinal member 4.

In all cases within the specified range of the present disclosure, the presence of the longitudinal guide 6 increases the energy absorbed between 13% and 14%.

TABLE 1 examples of different lengths of longitudinal guide

| Trial | Guide length (mm) | Guide length/ member length | Absorbed energy (in kJ) | Additional energy absorbed compared to "no guide" reference |
|---|---|---|---|---|
| R1 | no longitudinal guide | | 4 854 | reference |
| R2 | 450 | 4,5/5 | 2 987 | −38% |
| I1 | 100 | 1/5 | 5 461 | +13% |
| I2 | 200 | 2/5 | 5 519 | +14% |
| I3 | 300 | 3/5 | 5 477 | +13% |

A second example of various energy absorbing devices illustrating the present disclosure will now be detailed in reference to below Table 2.

In all examples of Table 2, the longitudinal member 4 is similar to the one of the first example of Table 1, namely I1.

The longitudinal guide 6 has a rectangular cross section and is made of the same material HX340LAD steel as the longitudinal member 4.

The longitudinal guide 6 has a thickness of 2 mm and a length of 200 mm so that the Guide length/member length ratio is 2/5.

Different cross sections of the longitudinal guide 6 have been chosen in order to illustrate the advantages of a particular embodiment of the present disclosure.

In all cases within the specified range of cross sections of the disclosure, the energy absorbed is increased by between 6% and 38% compared to the reference.

TABLE 2 examples of different cross sections of longitudinal guide

| Trial | Guide cross section (mm × mm) | Member cross section/ guide cross section | Absorbed energy (in kJ) | Additional energy absorbed compared to "no guide" reference |
|---|---|---|---|---|
| R1 | no longitudinal guide | | 4 854 | reference |
| I2 | 20 × 20 | 4.7 | 5 519 | +14% |
| I4 | 25 × 25 | 3 | 6 136 | +26% |
| I5 | 15 × 15 | 8.4 | 6 684 | +38% |
| I6 | 30 × 25 | 2.5 | 5 128 | +6% |

What is claimed is:

1. An energy absorbing device for a motor vehicle comprising:
    a hollow longitudinal member extending along a first longitudinal axis; and
    a longitudinal guide extending along a second longitudinal axis, arranged within the longitudinal member, and configured for guiding the deformation of the longitudinal member in case of an impact,
    wherein a ratio of a length of the longitudinal guide, measured along the second longitudinal axis, to a length of the longitudinal member, measured along the first longitudinal axis, is comprised between 1/5 and 3/5;

wherein the longitudinal guide has a longitudinal guide constant cross section along its whole length, and the longitudinal member has structural weaknesses, the longitudinal member having a longitudinal member constant cross section along its whole length apart from the structural weaknesses; and wherein a ratio of the longitudinal member constant cross section to the longitudinal guide constant cross section is comprised between 2 and 9.

2. The energy absorbing device according to claim 1, wherein the longitudinal member constant cross section is delimited by an outer contour, the outer contour defining a geometrical barycenter point, the geometrical barycenter point being included in the longitudinal guide constant cross section.

3. The energy absorbing device according to claim 1, wherein the structural weaknesses are predetermined portions of the longitudinal member which are weakened.

4. The energy absorbing device according to claim 3, wherein each structural weakness extends in a plane perpendicular to the first longitudinal axis of the longitudinal member.

5. The energy absorbing device according to claim 3, wherein at least one of the structural weaknesses is a welding line or a through hole or a row of through holes or a local reduction of cross section, or a change in the thickness or a change in a material of the longitudinal member.

6. The energy absorbing device according to claim 1, wherein the longitudinal guide comprises a guide wall having a thickness comprised between 1 mm and 4.0 mm.

7. The energy absorbing device according to claim 1, wherein the longitudinal member is closed at one end by a closing plate, the longitudinal guide being attached to said closing plate inside the longitudinal member.

8. The energy absorbing device according to claim 1, wherein the longitudinal guide is integral with the longitudinal member.

9. The energy absorbing device according to claim 1, wherein the longitudinal guide and the longitudinal member have rectangular or polygonal or circular cross sections.

10. The energy absorbing device according to claim 1, wherein the longitudinal member comprises a member wall having a slenderness ratio ($\lambda$) above 25, as defined by $\lambda = L/\sqrt{(Imin/A)}$ where:

L is the length of the member wall,
Imin is the second moment of inertia of the member wall,
A is the total cross-sectional area of the member wall.

11. The energy absorbing device according to claim 1, wherein the longitudinal member is a crash box or an extension of a cradle of the vehicle.

12. A motor vehicle body comprising an energy absorbing device according to claim 1.

13. A method for manufacturing the energy absorbing device according to claim 1, comprising:
   manufacturing the hollow longitudinal member;
   manufacturing the longitudinal guide; and
   assembling together said longitudinal guide in said longitudinal member.

14. The method according to claim 13, wherein the assembling comprises:
   welding the longitudinal guide to a closing plate,
   welding the longitudinal member to said closing plate, the longitudinal guide being arranged inside the longitudinal member.

* * * * *